United States Patent [19]

Flick

[11] 4,151,433
[45] Apr. 24, 1979

[54] COOLED SPIRAL WINDING FOR ELECTRICAL ROTATING MACHINE STATOR

[75] Inventor: Carl Flick, Pittsburgh, Pa.

[73] Assignee: Electric Power Research Institute, Inc., Palo Alto, Calif.

[21] Appl. No.: 800,640

[22] Filed: May 26, 1977

[51] Int. Cl.² ............................................. H02K 9/00
[52] U.S. Cl. ........................................ 310/54; 310/65; 310/198; 310/208; 310/254
[58] Field of Search ............... 310/184, 189, 194, 180, 310/198–207, 192, 193, 195, 208, 254, 260, 54, 64, 65, 61

[56] References Cited

U.S. PATENT DOCUMENTS

| | | | |
|---|---|---|---|
| 2,243,893 | 6/1941 | Blumlein | 310/194 X |
| 2,783,403 | 2/1957 | Schumaier | 310/198 UX |
| 3,324,322 | 6/1967 | Johns | 310/198 |
| 3,870,913 | 3/1975 | Shapiro | 310/208 |
| 4,019,075 | 4/1977 | Kagami | 310/206 |

FOREIGN PATENT DOCUMENTS 329670  5/1976  Austria ........................................ 310/179

OTHER PUBLICATIONS

"Neue Loesungswege zum Entwurf grosser Turbogeneratoren bis 2 GVA, 60 kV", by Gerhard Aichholzer, Eingelangt, 9-25-74.

Primary Examiner—Mark O. Budd
Attorney, Agent, or Firm—Flehr, Hohbach, Test, Albritton & Herbert

[57] ABSTRACT

An electrical rotating machine having winding coils with turns disposed in a pancake configuration which spirals outwardly about the axis of rotation of the machine. The coils are interleaved circumferentially about the axis with uniform and smooth inter-coil spacing for placement of electrical insulation of the type suitable for high voltage applications. The spiral pancake coils when assembled provide a generally cylindrical winding configuration which is conducive to being well-supported by the stator shield.

11 Claims, 7 Drawing Figures

COOLED SPIRAL WINDING FOR ELECTRICAL ROTATING MACHINE STATOR

BACKGROUND OF THE INVENTION

This invention in general relates to windings for electrical rotating machines, and in particular relates to the construction of armature windings for electrical machines of the turbine generator type.

Conventional electrical rotating machines such as turbine generators commonly employ armature windings in which the individual phase coils are diamond shaped. With such windings the end connections for the coils are of a complex shape, which is generally a conical involute. The involute shape of the coil ends as a result limits the extent to which the stator shield can provide support for the winding. Heretofore it has been difficult to provide simple and strong mechanical support for the coils against radial and tangential electromagnetic forces. A generator having windings which can be supported more securely than that of an involute type winding would make it possible to accept higher force levels and thus permit the generator to be designed for increased critical fault clearing time.

In existing electrical machines such as turbine generators the complex winding shapes result in a severe limitation on the use of insulation suitable for high voltage applications. The windings of electrical generators are typically insulated by a mica type material with the result that operating voltages are limited to the order of 30 kV. It would be desirable to provide a winding configuration which would accommodate the placement of insulation of the type for use in very high voltage applications, such as up to 500 kV. A generator capable of operating at this voltage level would thereby permit direct connection to a transmission system and eliminate the need of a step-up transformer.

OBJECTS AND SUMMARY OF THE INVENTION

It is the general object of the invention to provide an electrical rotating machine having a new and improved winding structure.

Another object is to provide a new and improved winding for an electrical machine, especially a turbine generator, by which the coils of the winding are well supported to resist electromagnetic forces.

Another object is to provide a winding configuration for an electrical machine which can accommodate the placement of electrical insulation of the type suitable for very high voltage applications.

Another object is to provide an electrical machine of the type described having an armature winding comprised of coils having series connected turns disposed in a spiral pancake configuration with the spiral coils being interleaved in spaced-apart relationship about the machine.

The invention in summary includes a winding for an electrical rotating machine in which the phase coils are formed in a spiral pancake configuration. Each coil comprises electrical conductor means formed in a plurality of series-connected concentric turns. The coils lie in outwardly spiraling paths and are circumferentially spaced about the winding with the turns of adjacent coils interleaved in radially overlapping relationship. The winding configuration is such that the stator shield provides strong support for the coils, particularly at the end connections. Smooth and uniform spaces are provided between the coils which permit placement of insulation of the type that would enable the machine to operate at very high voltage ratings.

The foregoing and additional objects and features of the invention will appear from the following description in which the several embodiments of the invention have been set forth in detail in conjunction with the accompanying drawings.

DESCRIPTION OF THE PREFERRED EMBODIMENTS

Figure 1:
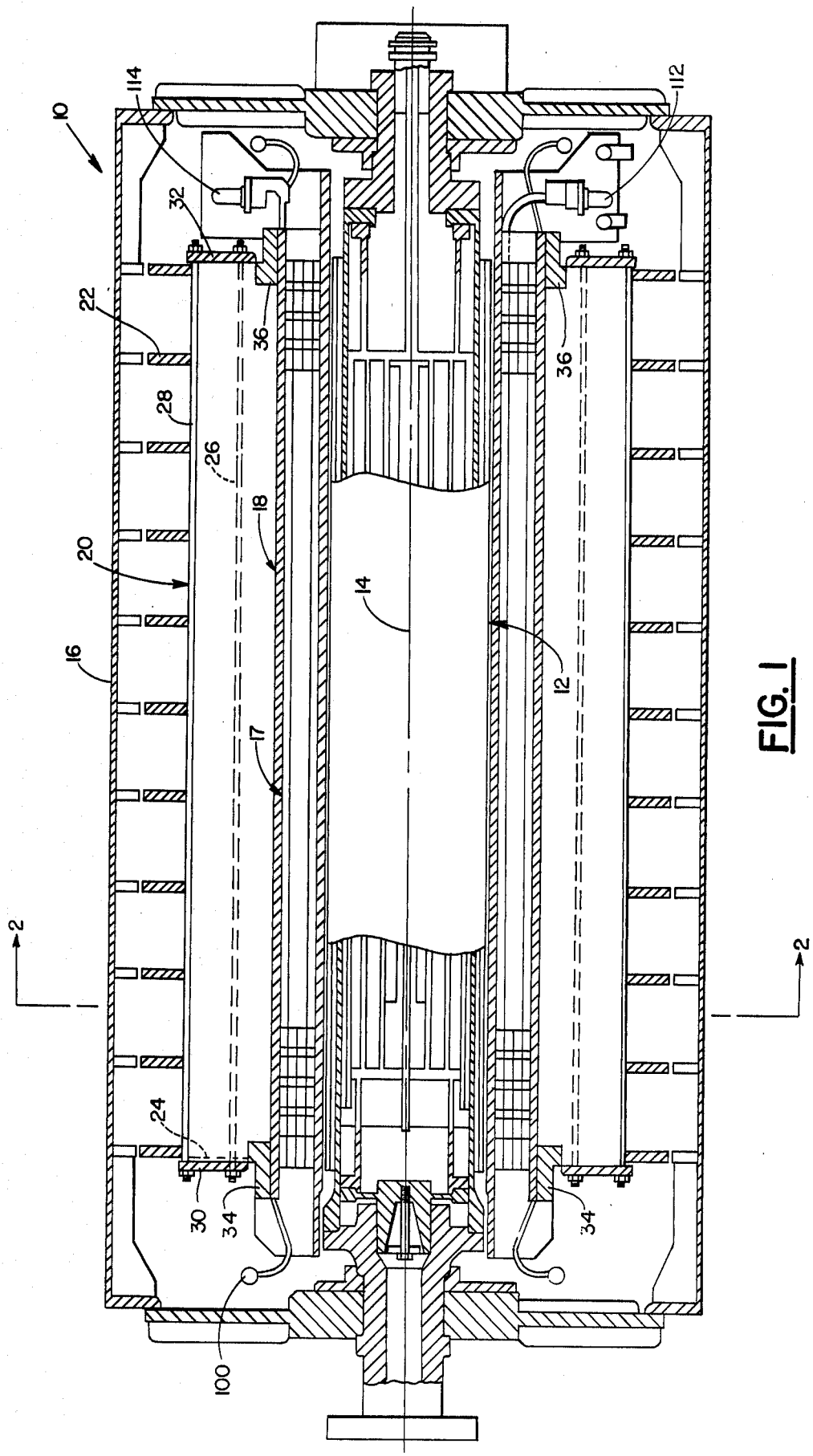
FIG. 1 is an axial section view of an electrical rotating machine incorporating the invention.
Figure 2:
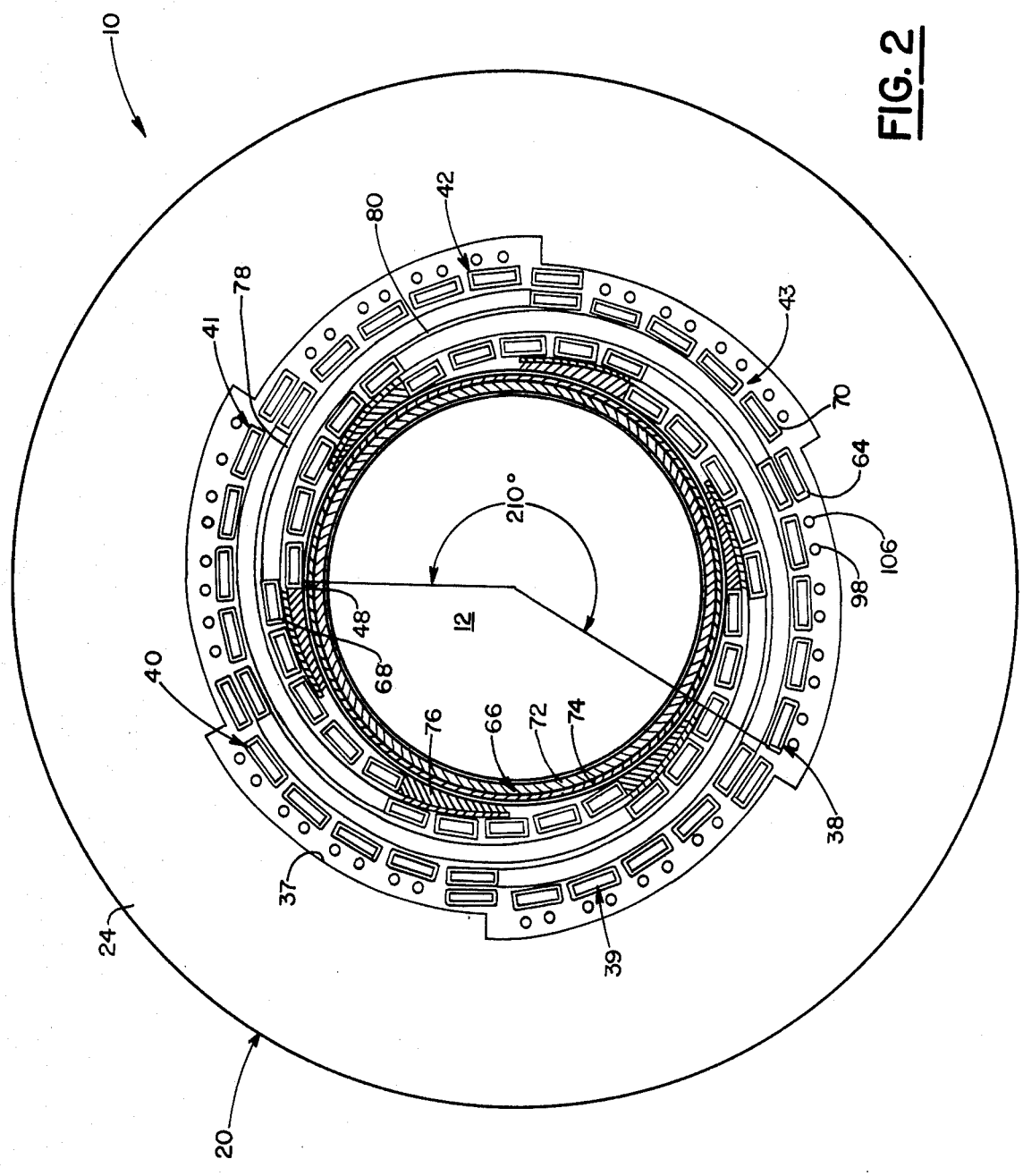
FIG. 2 is a cross-sectional view taken along the line 2—2 of FIG. 1.

In the drawings FIG. 1 and 2 illustrate generally at 10 an electrical rotating machine incorporating the invention and which comprises a two-pole turbine generator with a rotor 12. While a two-pole electrical machine is described, it is understood that the invention can also have application to machines with two or more poles.

The rotor 12 is turbine-driven and is mounted for rotation about longitudinal axis 14 of an outer frame 16. The construction and operation of the rotor forms no part of this invention and thus need not be described in detail. The rotor preferably is of the superconducting type which establishes a strong rotating magnetic field sweeping across the armature winding 17 of a stator 18 which is mounted about the rotor. A superconducting rotor of the type which is suitable for use with the invention is that shown in U.S. Pat. No. 3,816,780.

An annular stator shield 20 is mounted about stator 18 by means of radially projecting ribs 22 which connect with outer frame 16. The stator shield is laminated of a large plurality of thin plates or laminae 24, e.g., 1/50" thickness, formed of a suitable magnetic material such as magnetic silicon iron. Elongate bolts 26, 28 extend through apertures formed in the laminae and end plates 30, 32 for securing the stator shield together. Support rings 34, 36 formed of a suitable non-metallic material are mounted within notches in the inner corners of the end laminae to form extensions of the shield. The inner edges of the laminae are formed with stepped notches 37 (FIG. 2) to form a contour which generally conforms with the outer periphery of the armature winding.

Figure 3:
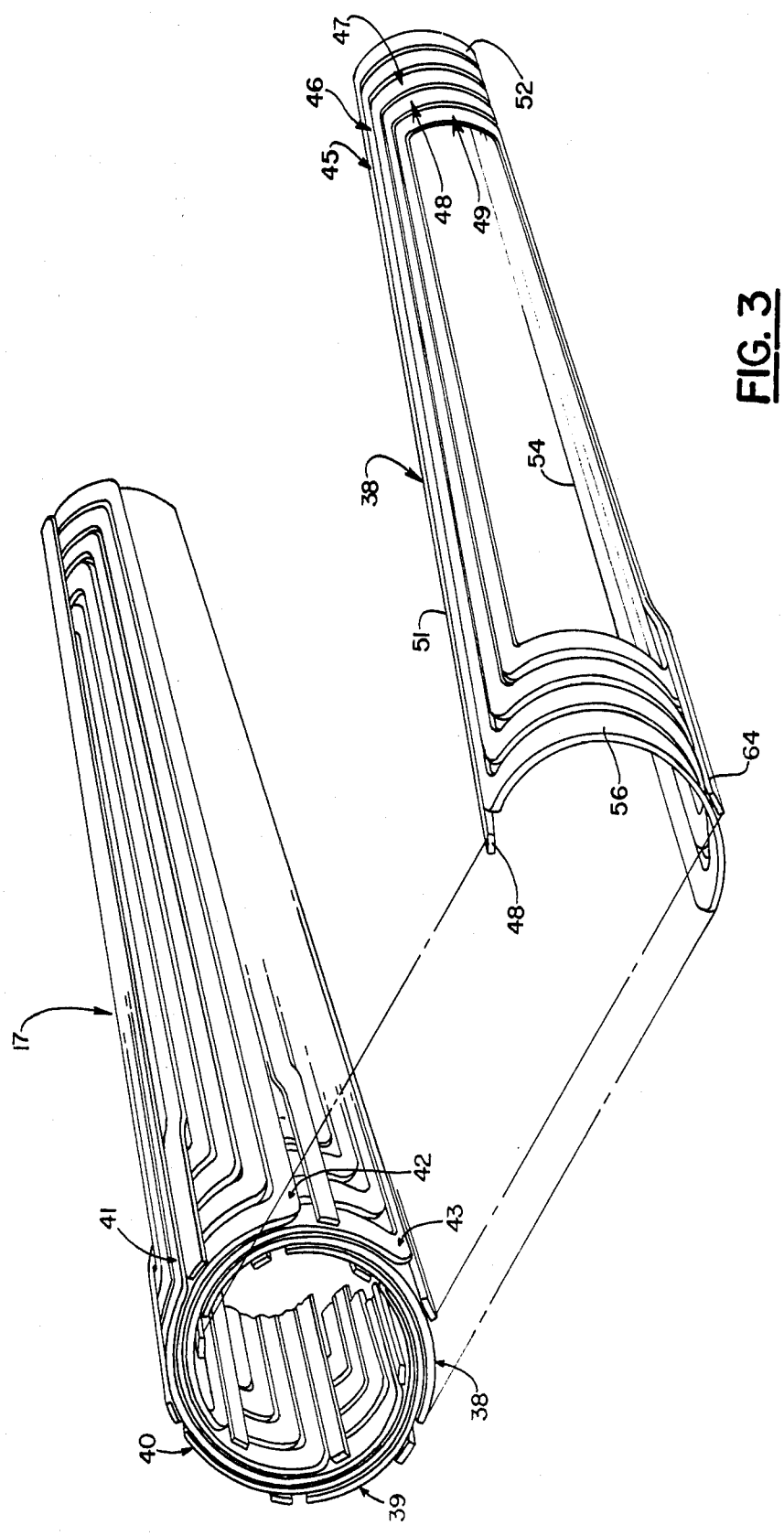
FIG. 3 is a perspective exploded view illustrating the armature winding of the machine.
Figure 4:
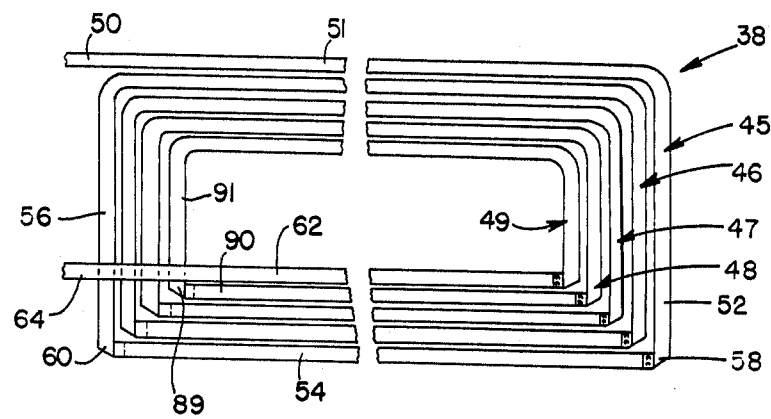
FIG. 4 is a plan developed view of one coil of the winding of FIG. 3.

Armature winding 17 comprises a plurality, illustrated as six, of phase coils 38–43 each of which is formed with a spiral pancake configuration. The construction of coil 38 is typical and comprises a plurality, illustrated as five, of generally rectangular, concentric series connected turns 45–49 (FIGS. 3 and 4). The outer turn 45 comprises a phase connection end 50 which is a straight axial extension of the inner coil segment or side 51. The outer turn is completed by end segment 52, outer segment 54 and end segment 56. Header joints 58 and 60 connect the end segments of the turn with outer segment 54. The remaining turns of the coil are of similar configuration with the outer segments of each turn being coupled with the respective end segments by header joints similar to the joints 58, 60. The outer segment 62 of inner turn 49 is bent up and over the remaining four turns where it extends straight out to phase connection end 64.

FIG. 2 illustrates the spiral geometry and interleaving of the coils about the armature. The six coils are circumferentially positioned at equal intervals with the innermost segment of each coil abutting a cylindrical armature winding support 66. The remaining turns of each coil lie in a path which spirals outwardly through an arc, illustrated as 210°, with the outermost segment of the outer turn lying on the outer diameter of the winding. The angular displacement and radial spacing between the coils is such that the phase connection end forming an extension of the inner segment of the outer turn of each coil, e.g., end 48 shown in FIG. 2 for coil 38, runs parallel with and below the edge of the inner segment on the innermost turn for the next-adjacent coil, e.g., turn segment 68 for coil 43. The phase connection end leading from the innermost turn, e.g., end 64 for coil 38, is positioned so as to run parallel with and alongside the outer segment of the outer turn of the next-adjacent coil, e.g., segment 30 for coil 43.

Armature winding support 66 comprises a plurality of hollow cylinders 72, 74 formed of a suitable fiber-reinforced material which are adapted to be wedged out for tightening up against the coils and supply mechanical support for the armature winding. The innermost cylinder 72 is spaced from the outer surface of rotor 12 to define an air gap. A layer 76 of a suitable conformable material is placed between outer support cylinder 74 and the coils to facilitate assembly and to provide mechanical support for the inner turns. The conformable material can be a synthetic resin which is soft and flowable during assembly and which then sets and hardens.

The pancake coils spiral outwardly along paths which define spiral-shaped inter-coil spacing 78, 80. This inter-coil spacing is uniformly smooth and continuous such that it is suitable for placement of flat electrical insulating material, e.g., laminated, thin insulating sheet structure, of the character which can insulate the coils for very much higher voltage operation as compared to conventional mica-resin insulation material. The placement of such insulating material in the inter-coil spacing would enable operation of the machine at very high voltage ratings, e.g., up to 500 kV. When the spiral pancake coil structure of the invention is used for lower voltage applications the inter-coil spacing could be filled with other material such as the conformable synthetic resin, as required.

The number of phase coils, and the number of turns for each coil, would depend upon the particular design specifications and requirements. For example, while five turns for each coil are illustrated, the number of turns could be greater or less depending upon design factors such as the size of the machine and the voltage rating.

Figure 7:
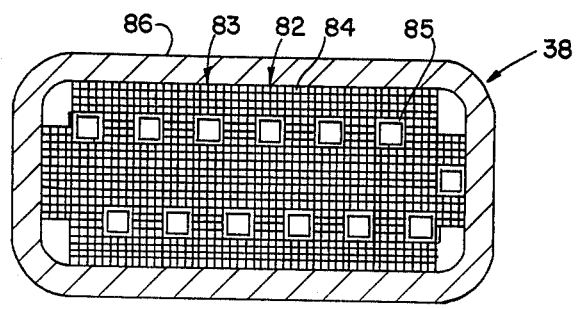
FIG. 7 is a cross-sectional view taken along the line 7—7 of FIG. 6.

Details of the construction of the typical coil 38 are illustrated in FIG. 7. This coil comprises a plurality of sub-conductors 82, 83 which are arrayed together in parallel to form a generally rectangular coil section. At regular intervals along the length of the coil the subconductors are transposed about the longitudinal axis. Each individual subconductor comprises a plurality of fine strands 84, preferably of copper and mutually insulated with a synthetic varnish film. The strands are twisted in layers about cooling tubes 85 which extend along the axis of the subconductor. An outer sheath 86 formed of a suitable insulating material such as mica-resin encloses the subconductors along the length of the coil.

Figure 5:
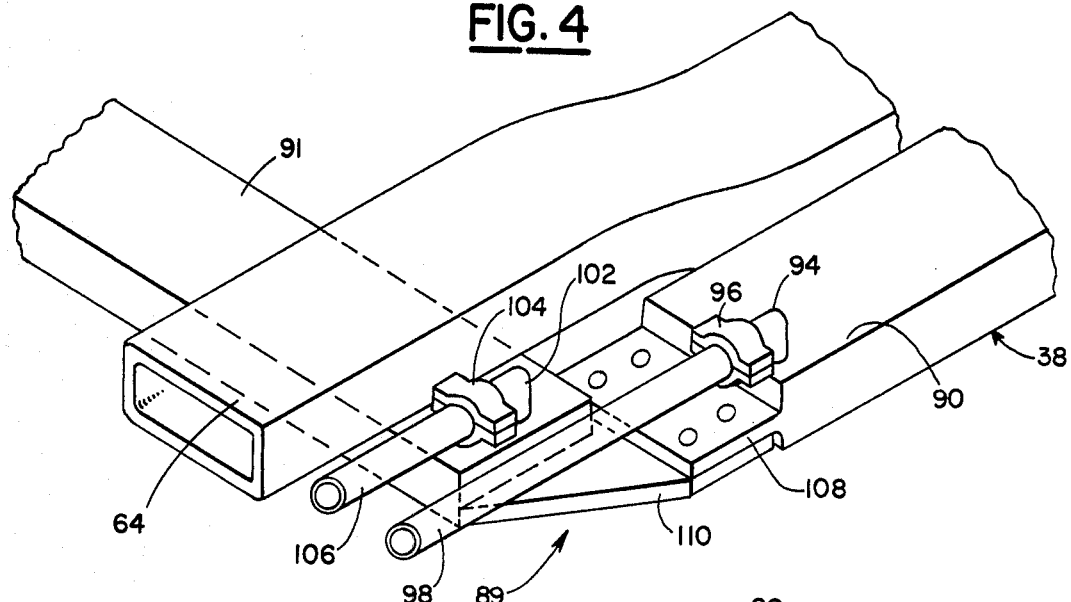
FIG. 5 is a perspective view to an enlarged scale illustrating a typical interconnection at the corner of one turn of the coil of FIG. 4.
Figure 6:
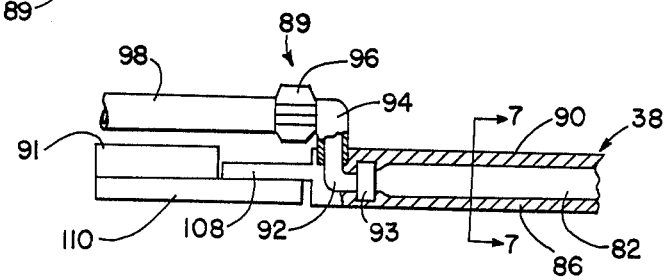
FIG. 6 is a fragmentary section view of the interconnection of FIG. 5.

The typical header structure 89 such as shown in FIG. 5 and 6 provides electrical series connection between the turn segments 90, 91 and also provides for connection of the cooling tubes 85 with a source of coolant medium. The tubes 85 terminate just inside the header and connect to passageway 92 by a cavity 93 which is machined in the header. Passageway 92 in turn is connected with an elbow 94, coupler 96 and distributor piping 98 formed of a suitable electrical insulating material. Piping 98 extends to a connection with the water manifold 100 shown in FIG. 1. Similarly, the ends of the cooling tubes within turn segment 91 connect through elbow 102 and coupler 104 with an insulating distributor piping 106 leading to the water manifold. A metal tongue 108 coupled with the ends of the conductors within segment 90 overlaps with a metal tongue 110 coupled with the conductors within segment 91. The tongues are joined together to form a series connection. The pairs of inlet and outlet distributor piping for the four header joints on one side, and five header joints on the opposite side, project axially from either end of the armature winding for connection with the header piping.

Six phase connection structures 112, 114 are spaced about one end of machine 10. Each structure is coupled with the phase connection ends of a respective one of the coils. As best illustrated in FIG. 3 it is seen that the phase connection ends at the outer periphery of each coil extend axially in a straight path parallel with and alongside the outer turn of the next adjacent coil so as to form a combined cylindrical configuration for the overall winding structure. This cylindrical configuration permits the inner wall of the stator shield to conform with and extend straight out and around the winding so that the latter is well supported by the shield, especially at the end connections.

In use and operation, the spiral pancake configuration for the coils of the armature winding is employed in an electrical rotating machine to provide a number of important results both for high and low voltage ratings. The coil configuration provides inter-coil spacing which is uniformly smooth and continuous for the placement of flat insulation of the type appropriate for the high voltage operation. In such case the machine can be coupled directly to a transmission system without the requirement for a step-up transformer. In either high or low voltage application the coils are well supported, especially at the coil ends, by the stator shield as a result of the generally cylindrical configuration of the armature winding. Axial expansion of the winding is also accommodated for by the end support.

While the foregoing embodiment is at present considered to be preferred it is understood that numerous variations and modifications may be made therein by those skilled in the art and it is intended to cover in the appended claims all such variations and modifications as fall within the true spirit and scope of the invention.

What is claimed is:

1. An armature having an airgap winding for use in an electrical rotating machine operating at high voltages on the order of 30 kV and above, the armature comprising a plurality of coils mounted about the axis of rotation of the machine, said coils being adapted for coupling in an electrical circuit, each coil comprising electrical conductor means forming a plurality of concentric turns which are series connected, the turns in each coil lying in a path which spirals outwardly about the axis of rotation with the coils circumferentially positioned about the axis so that portions of the turns in a coil interleave in overlapping relationship with portions of the turns of an adjacent coil, with adjacent coils being radially spaced apart to define outwardly spiralling, continuous inter-coil spacing for the placement of insulation, said electrical conductor means for each said coil including a plurality of elongate parallel conductors, conduit means mounted in heat-exchange relationship along the conductors, an electrical insulating sheath enclosing the conductors and conduit means along the length of each said coil, and means for directing coolant medium through said conduit means.

2. An armature winding as in claim 1 in which said means for directing coolant includes insulating piping for directing coolant medium into and from said conduit means.

3. An armature winding as in claim 1 in which each said coil is formed with generally rectangular turns, each of which has side portions joined together with right-angle corners, together with header means for directing the coolant medium into and from the conduit means at one of said right-angle corners and for electrically coupling the conductors in series connection at the corners.

4. A winding as in claim 3 which includes means sealing the end of the sheath which joins with the header means, and distributor conduit means connected through the sealed end of the sheath in communication with the conduit means therein.

5. An electrical rotating machine for operating at high voltage on the order of 30 kV and above comprising a rotor mounted for rotation about an axis for establishing a rotating magnetic field, an annular stator shield, an airgap armature winding mounted within the shield and about the rotor, said winding comprising a plurality of coils, each coil being formed of conductor turns which are series connected and are disposed in a pancake configuration which lies in a path spiralling outwardly from the inner periphery of the armature, said coils being radially spaced apart in interleaved relationship about the armature winding to define outwardly spiralling continuous inter-coil spaces for placement of insulation, each said coil including conduit means for directing a coolant medium in heat-exchange relationship with the conductor turns, distributor piping means for directing the coolant medium into and from the conduit means, with the pancake configuration of the turns permitting the distributor piping to extend in an axial path to the armature for connection with the conduit means, and means for supporting the radial portions of the coils by the inner wall of the stator shield.

6. An electrical machine as in claim 5 in which said distributor piping means includes piping formed of an insulating material.

7. An electrical rotating machine for operating at high voltage on the order of 30 kV and above comprising a rotor mounted for rotation on an axis for establishing a rotating magnetic field, an airgap armature winding mounted about the rotor, said winding comprising a plurality of coils, each coil being formed of conductor turns which are series connected and are disposed in a pancake configuration and which lies in a path spiralling outwardly from the inner periphery of the armature, said coils being radially spaced apart in interleaved relationship about the armature winding to define outwardly spiralling, continuous inter-coil spaces for placement of insulation, and an annular stator shield mounted about said winding, the inner wall of the stator shield including a plurality of axially-extending stepped notches formed with outwardly spiralling contours closely conforming to the radial outer surface of said winding to provide mechanical support for said winding.

8. An electrical machine as in claim 7 including conductor extensions integral with opposite ends of each said coil, said extensions projecting axially from the armature for phase connection in an electrical circuit, said annular stator shield extending about and forming support for said conductor extensions.

9. An electrical machine as in claim 7 in which said annular stator shield includes end portions extending about the axial ends of the winding to provide mechanical support for the windings.

10. An electrical machine as in claim 7 including an inner cylindrical insulating support having an inner wall concentric with the rotor and an outer wall abutting the winding to provide an additional mechanical support therefor.

11. An electrical machine as in claim 7 in which said annular stator shield is formed of a large plurality of laminae of a magnetic material.

* * * * *